United States Patent
Gou

(10) Patent No.: US 10,323,840 B1
(45) Date of Patent: Jun. 18, 2019

(54) WEARABLE ARTICLE AND INTELLIGENT WEARABLE DEVICE

(71) Applicant: Terry Electronics Technology Company Limited, Shenzhen, Guangdong (CN)

(72) Inventor: Tingdong Gou, Guangdong (CN)

(73) Assignee: Terry Electronics Technology Company Limited, Shenzhen (CN)

( * ) Notice: Subject to any disclaimer, the term of this patent is extended or adjusted under 35 U.S.C. 154(b) by 0 days.

(21) Appl. No.: 15/896,011

(22) Filed: Feb. 13, 2018

(51) Int. Cl.
  F21V 21/00 (2006.01)
  F21V 33/00 (2006.01)
  H05B 33/08 (2006.01)
  H05B 37/02 (2006.01)

(52) U.S. Cl.
  CPC .......... F21V 33/0008 (2013.01); F21V 21/00 (2013.01); H05B 33/0872 (2013.01); H05B 37/0236 (2013.01)

(58) Field of Classification Search
  CPC ............ F21V 33/0008; H05B 33/0872; H05B 37/0236
  USPC .......................... 362/103, 108, 570, 105, 106
  See application file for complete search history.

(56) References Cited

U.S. PATENT DOCUMENTS

| 4,234,907 | A  | * | 11/1980 | Daniel ................ | A41D 27/085 139/420 R |
| 7,234,853 | B2 | * | 6/2007  | Givoletti ............. | B60R 13/02 160/10 |
| 7,466,896 | B2 | * | 12/2008 | Tao ..................... | A47G 9/0284 362/556 |
| 7,592,276 | B2 | * | 9/2009  | Hill ..................... | D02G 3/441 313/511 |
| 7,630,591 | B2 | * | 12/2009 | Allen ................... | D03D 15/00 250/227.11 |
| 8,453,357 | B2 | * | 6/2013  | Beers ................... | A43B 3/001 36/137 |
| 8,536,075 | B2 | * | 9/2013  | Leonard ............... | D02G 3/441 313/511 |
| 9,069,121 | B2 | * | 6/2015  | Ligorano .............. | G02B 6/04 |
| 2003/0137852 | A1 | * | 7/2003 | Rapisarda ........... | A41D 13/01 362/570 |
| 2006/0087832 | A1 | * | 4/2006 | Peng ................... | D03D 15/00 362/103 |
| 2015/0335135 | A1 | * | 11/2015 | Stoll ................... | F21L 4/08 362/108 |

* cited by examiner

Primary Examiner — Laura K Tso

(57) ABSTRACT

The present disclosure relates to a wearable article including a wearable article body, a light collector, and a light source. The wearable article body is formed by weaving a plurality of textile threads with a plurality of light-guiding filaments, and provided with a light-collecting region. The light collector is provided at the light-collecting region, and is provided with a light source placement region. Light-guiding entrances of the plurality of light-guiding filaments being grouped together at the light collector to respectively transmit light received by the light collector. The light source is detachably placed in the light source placement region. An intellectual wearable device is also disclosed.

10 Claims, 4 Drawing Sheets

WEARABLE ARTICLE AND INTELLIGENT WEARABLE DEVICE

TECHNICAL FIELD

The present disclosure relates to the field of wearable, and more particularly to a wearable article and an intelligent wearable device.

BACKGROUND

At night or in low visibility condition, in order to make wearable articles (such as clothes, shoes and caps, etc.) produce strong lighting decoration or warning effect, two methods, namely active light emission and passive light emission are often used in the prior art to realize lighting or warning effect.

For active light emission method, usually a light-emitting element such as an LED lamp is disposed on a wearable article to realize active light emission. When this active light emission mode is used, it is often necessary to have a large area of circuit or electrical signal transmission wirings provided on the wearable article. Since the shape of the wearable article is constantly changing, it is therefore easy to cause damage to the circuit structure. On the one hand, this shortens the working life of the light-emitting components; and on the other hand, this causes potential safety issue when short circuit of the circuit structure occurs.

For the passive light emission method, a reflective material, such as fluorescent paint or the like, is usually applied to the wearable article and is visualized by reflection. However, light intensity produced by such passive lighting is limited by the intensity of the light source. When the intensity of the light source is insufficient, the light reflection effect is poor, and the object of showing of clear illumination cannot be achieved.

Therefore, how to improve luminous effect of a wearable article while reducing its potential safety hazard has become a technical problem to be solved urgently.

SUMMARY

A technical problem to be solved by the present disclosure is how to reduce the potential safety hazard and improve luminous effect of a wearable article.

According to one aspect, there is provided a wearable article which may include:
- a wearable article body, formed by weaving a plurality of textile threads with a plurality of light-guiding filaments, at least one of the plurality of light-guiding filaments being able to transmit some light, the wearable article body being provided with a light-collecting region;
- a light collector, provided at the light-collecting region, the light collector being provided with a light source placement region, light-guiding entrances of the plurality of light-guiding filaments being grouped together at the light collector to respectively transmit light received by the light collector; and
- a light source, detachably placed in the light source placement region for providing light to the light collector.

In one embodiment, the light source is a three-color LED (light-emitting diode) lamp, the light source placement region is a through-hole structure that cooperates with the three-color LED lamp, the three-color LED lamp is capable of penetrating into one end of the through-hole structure, and the light-guiding entrances of the plurality of light-guiding filaments are grouped together at another end of the through-hole structure.

In one embodiment, the wearable article may further include a control box, the control box including a printed circuit board which provides a drive signal to the light source in order to control light emission state of the light source.

In one embodiment, the control box may further include:
- a battery, which supplies power to the printed circuit board;
- a flexible filler, disposed between the printed circuit board and the battery; and
- a resin glue, filled up inside the control box.

In one embodiment, the wearable article may further include an acquisition module, in signal communication with the printed circuit board, wherein the printed circuit board adjusts the drive signal provided to the light source according to a sound wave signal acquired by the acquisition module.

In one embodiment, the wearable article may further include an audio module, in signal communication with the printed circuit board to propagate sound wave upon excitement by an audio signal provided by the printed circuit board.

In one embodiment, the wearable article may further include:
- a memory, that stores a plurality of audio signals, the plurality of audio signals being respectively mapped one to one with a plurality of trigger signals;
- wherein the printed circuit board analyzes the sound wave signal acquired by the acquisition module so as to obtain a trigger signal that corresponds to the acquired sound wave signal, and the printed circuit board retrieves an audio signal that corresponds to the trigger signal from the memory according to the trigger signal, and transmits the audio signal to the audio module.

In one embodiment, the wearable article may further include:
- a trigger, in responding to a preset trigger condition, activates the printed circuit board to transmit to the audio module an audio signal that corresponds to the trigger condition.

In one embodiment, the control box may further include a wireless communication module, in signal communication with the printed circuit board, the wireless communication module being configured to carry out data interaction with an external terminal.

According to another aspect, there is provided an intelligent wearable device, including the wearable article according to the above, wherein the wearable article body is a jacket, a cap, a backpack, or a glove.

According to yet another aspect, there is provided An intelligent wearable device, comprising the wearable article according to the above, wherein the wearable article body is a shoe, the control box is provided in a sole of the shoe, the plurality of light-guiding filaments extend respectively from two sides of an upper of the shoe to the sole of the shoe, group together, and then connect to the light collector.

BRIEF DESCRIPTION OF THE DRAWINGS

In order to more clearly illustrate the technical solution provided by the embodiments of the present disclosure, the drawings to be used in the description of the embodiments will be briefly described below. It will be apparent that the drawings mentioned in the following description are merely some implementations of the present disclosure. Without making any creative effort, a person skilled in the art may derive other drawings from the drawings of the present disclosure, wherein.

DETAILED DESCRIPTION

In order to more clearly illustrate the technical solution provided by the embodiments of the present disclosure, the drawings to be used in the description of the embodiments will be briefly described below. It will be apparent that the drawings mentioned in the following description are merely some implementations of the present disclosure. Without making any creative effort, a person skilled in the art may derive other drawings from the drawings of the present disclosure, wherein:

In the description of the present disclosure, it is noted that, unless otherwise specified and qualified, the terms such as "mounted", "connected", and "interconnected", etc., should be understood in a broad sense, for example, by means of a fixed connection, a detachable connection, or an integrated connection; Can be mechanical connection, can also be electrical connection; It can be connected directly, indirectly through intermediate media, or it can be connected within the two components, can be wireless connection, can be wired connection, for the common technician in this field. The specific meaning of the above terms in the present disclosure can be understood by one skilled in the art.

In addition, the technical features involved in different embodiments of the present disclosure described below may be combined as long as they do not constitute a conflict with each other.

Figure 1:
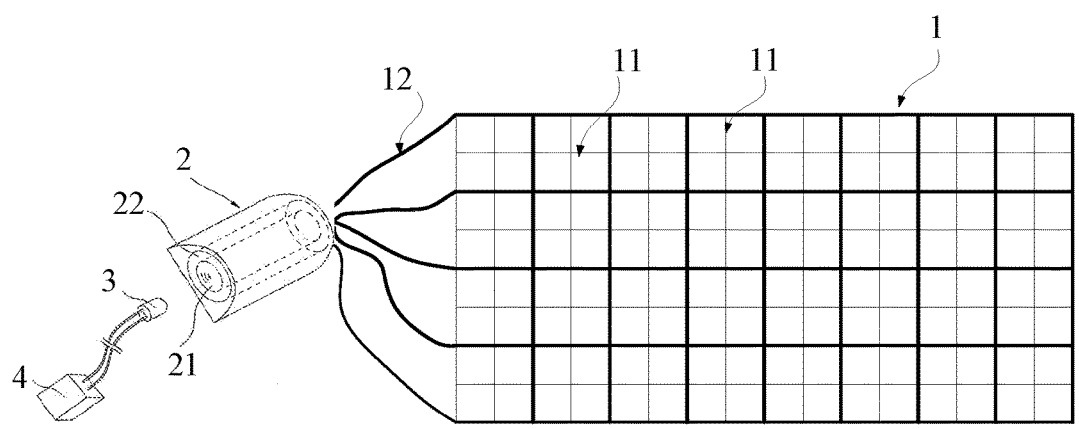
FIG. 1 is a schematic view of a wearable article according to an embodiment of the present disclosure.

In order to reduce potential safety hazard and improve luminous effect of a wearable article, the present embodiment discloses a wearable article. Referring to FIG. 1, which is a schematic diagram of the structure of a wearable article disclosed in this embodiment. The wearable article may include a wearable article body 1, a light collector 2, and a light source 3.

The wearable article body 1 may be formed by weaving a plurality of textile threads 11 with a plurality of light-guiding filaments 12. At least one of the plurality of light-guiding filaments 12 can transmit some light. In a specific embodiment, the plurality of textile threads 11 and the plurality of light-guiding filaments 12 may be weaved together, or the plurality of textile threads 11 and the plurality of light-guiding filaments 12 may be weaved separately according to regions. When the wearable article body 1 is weaved, a pattern can be formed. The pattern may follow certain rule or may be symbolic, or it can be a random pattern. In this embodiment, the wearable article body 1 may be provided with a light-collecting region (reference numeral is not shown in FIG. 1). After collecting optical signals through the light-collecting region, light-guiding filaments can transmit the collected light. Since at least one light-guiding filament can transmit some light, therefore, when the light-guiding filament transmits light, at least a part of the wearable article body 1 can glow. In this embodiment, the wearable article body 1 may be a jacket, a cap, a backpack, or a shoe, etc.

The light collector 2 may be disposed at the light-collecting region. The light collector 2 may be used to provide a light source placement region 21. Light-guiding entrances of the plurality of light-guiding filaments 12 can be grouped together at the light collector 2 to respectively transmit light received by the light collector 2. In a particular embodiment, when light is received in the light collector 2, light can enter the light-guiding filament 12 through the light-guiding entrance of each light-guiding filament 12, thereby transmitting light within the light-guiding filaments 12.

The light source 3 may be detachably placed in the light source placement region for providing light to the light collector 2. In a particular embodiment, the light source 3 may be an LED (light emitting diode) lamp. Specifically, the light source can be a three-color LED lamp, which can provide different colors of light, such as red, yellow and blue. In a specific embodiment, the light source placement region 21 may be a through-hole structure that cooperates with the three-color LED lamp. The through-hole can be covered with an opaque cover layer 22 to reduce loss of optical signal of the light source 3. In the present embodiment, the three-color LED lamp may penetrate into one end of the through-hole structure. The light-guiding entrances of the plurality of light-guiding filaments may be grouped together at the other end of the through-hole structure. It should be noted that, in a specific embodiment, the three-color LED lamp may have a common cathode or a common anode. It should be noted that the light source 3 may be detached from the wearable article body 1. That is, the light source 3 and the wearable article body 1 may be produced separately as long as the light source 3 and the light collector 2 can be coupled together.

Referring to FIG. 1, in an optional embodiment, the wearable article may further include a control box 4. Specifically, the control box 4 may include a printed circuit board (PCB) for providing drive signals to the light source to control the light emission state of the light source. In the present embodiment, the light emission state of the light source may be the intensity of the optical signal, the color of the optical signal, the on-off state of the optical signal, and the like.

Figure 2:
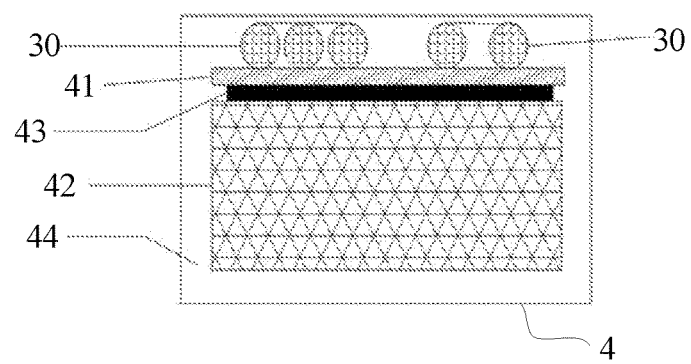
FIG. 2 is a cross-sectional view of a control box according to an embodiment of the present disclosure.

FIG. 2 is a cross sectional view of the structure of the control box of the present disclosure. In an alternative embodiment, the control box 4 may include a PCB 41, a battery 42, a flexible filler 43, and resin glue 44. The battery 42 can provide power to the PCB 41. One end of each signal line 30 may be connected to the PCB 41. The signal lines 30 may transmit control signals provided by the PCB 41 to control the light emission state of the LED lamp. A flexible filler 43 may be disposed between the PCB 41 and the battery 42. In a specific embodiment, the flexible filler 43 may be adhered to the PCB 41 and the battery 42. In an embodiment, the flexible filler 43 may include, for example, ethylene-vinyl acetate copolymer (EVA) plastic material. Of course, the flexible filler 43 may also include other flexible materials with stretchability. The resin glue 44 may be filled up in the control box to achieve waterproof of the components inside the control box. In the present embodiment, when the battery is used for charging and discharging for too long and the battery is completely sealed within an enclosed space, gas may be generated inside the battery, resulting in an increase in the overall battery thickness. At this time, the battery needs a space to expand. In the present embodiment, through the protection of the soft body of the EVA material, the thickness of the EVA material can be compressed so that the casing of the battery would not be squeezed, and hence the casing of the battery would not break or burst.

Figure 3:
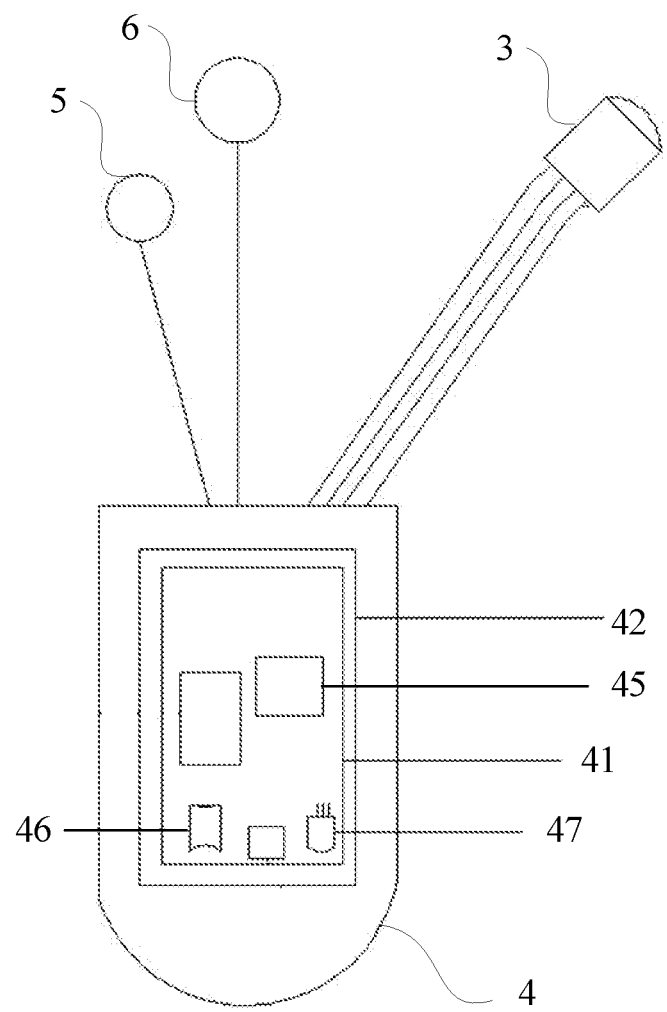
FIG. 3 is a schematic diagram of the control box and other components according to an embodiment of the present disclosure.

FIG. 3 is a schematic diagram showing the connection between a controller and some components. In an optional embodiment, the wearable article may further include an acquisition module 5. The acquisition module 5 may be in signal communication with the PCB 41. The PCB 41 can adjust the drive signal transmitted to the light source 3 according to the sound wave signal acquired by the acquisition module 5. In the present embodiment, the acquisition module 5 may be a component, such as a microphone, having sound wave signal acquisition function.

In an alternative embodiment, the wearable article may further include an audio module 6. The audio module 6 may be connected with the PCB 41 for transmitting sound wave upon excitement by audio signal provided by the PCB 41. In a specific embodiment, the audio module 6 may be disposed in the control box 4, and may be at least partially exposed from the control box 4. The audio module 6 may also be disposed outside the control box 4, and may be embedded in the wearable article body.

In an optional embodiment shown in FIG. 3, the wearable article may further include a memory 45. The memory 45 may store a plurality of audio signals, and the plurality of audio signals may respectively map one to one with the plurality of trigger signals. The PCB 41 may analyze a sound wave signal acquired by the acquisition module 5 so as to obtain a trigger signal that corresponds to the acquired sound wave signal. The PCB 41 may retrieve the audio signal that corresponds to the trigger signal from the memory 45 according to the trigger signal, and transmit the audio signal to the audio module 6. For ease of understanding by those skilled in the art, as an example, after the acquisition module 5 acquires the sound wave signal of "hello", the PCB 41 may analyze this sound wave signal in order to obtain a trigger signal that corresponds to "hello". Then, a corresponding audio signal such as "hi", "welcome" or the like, may be retrieved from the memory 45, and the retrieved audio signal may be transmitted to the audio module 6, so that the audio module can propagate the audio signal. It should be noted that this is merely an example, and cannot be considered as all technical solutions of the embodiments of the present disclosure, or a limitation of the technical solutions of the embodiments of the present disclosure. Specifically, the sound wave signal may also be a command to implement sound control. For example, when the sound wave signal is "sing a song" or "tell a story," an audio signal of the music or the story may be retrieved respectively. It should be noted that, in this embodiment, the kind of language of the sound wave signal is not limited, and may be English, Chinese, German, French, Japanese, Korean, etc.

In an alternative embodiment, the wearable article may also include a trigger 46. The trigger 46, in responding to a preset trigger condition, may activate the PCB 41 to transmit an audio signal that corresponds to the trigger condition to the audio module 6. In an embodiment, the trigger 46 can be a timer, and the preset trigger condition can be the reaching of a preset time. For example, when a preset time period or time is reached, the PCB 41 may be activated to transmit an audio signal to the audio module 6, such as "tell you a story okay?". In another embodiment, the trigger 46 can be a sensor, and the preset trigger condition is that the sensor receives a sensing signal, such as a touch or an interruption. Specifically, for example, when the sensor senses that the wearable article is removed, the PCB 41 may be activated to transmit an audio signal to the audio module 6, such as "do you want to sleep?". It should be noted that after the trigger 46 activates the PCB 41 to transmit an audio signal to the audio module 6, the acquisition module 5 may also acquire a surrounding feedback sound wave signal and respond accordingly according to the acquired sound wave signal. As an example, the trigger 46 activates the PCB 41 to transmit an audio signal to the audio module 6, for example, "tell you a story okay?". The user may reply: "okay". At this point, the acquisition module 5 may acquire the sound wave signal of "okay". Then, according to the "Okay" trigger signal, the PCB 41 may retrieve an audio signal (e.g. a preset audio story) that corresponds to the "okay" trigger signal from the memory 45 and transmit it to the audio module 6.

In an alternative embodiment, the control box 4 may further include a wireless communication module 47. The wireless communication module 47 may be connected with the PCB 41. The wireless communication module 47 can be used for data interaction with an external terminal. In a particular embodiment, the wireless communication module 47 may be a communication module using infrared, Bluetooth, or other wireless communication means. The external terminal may be a dedicated remote controller or may be implemented by a mobile terminal. The mobile terminal may be a terminal device, such as a mobile phone, a tablet, a personal digital notepad, etc. having wireless communication function.

The present embodiment also discloses an intelligent wearable device which may include the wearable article. The wearable article may include the wearable article body, the light collector and the light source. The wearable article body may be formed by weaving a plurality of textile threads with a plurality of light-guiding filaments. At least one of the plurality of light-guiding filaments can transmit some light. The wearable article body may be provided with a light-collecting region. The light collector may be disposed in the light-collecting region. The light collector may be used to provide a light source placement region. Light-guiding entrances of the plurality of light-guiding filaments can be grouped together at the light collector to transmit light received by the light collector. The light source may be detachably placed in the light source placement region for providing light to the light collector. It should be noted that the wearable article may also include elements that are disclosed in the above embodiments, such as controller, etc. The embodiment and specific example of these elements of the wearable article may include the disclosure of the above embodiments. In the present embodiment, the wearable article body may be a jacket, a cap, a backpack, or a glove.

Figure 4:
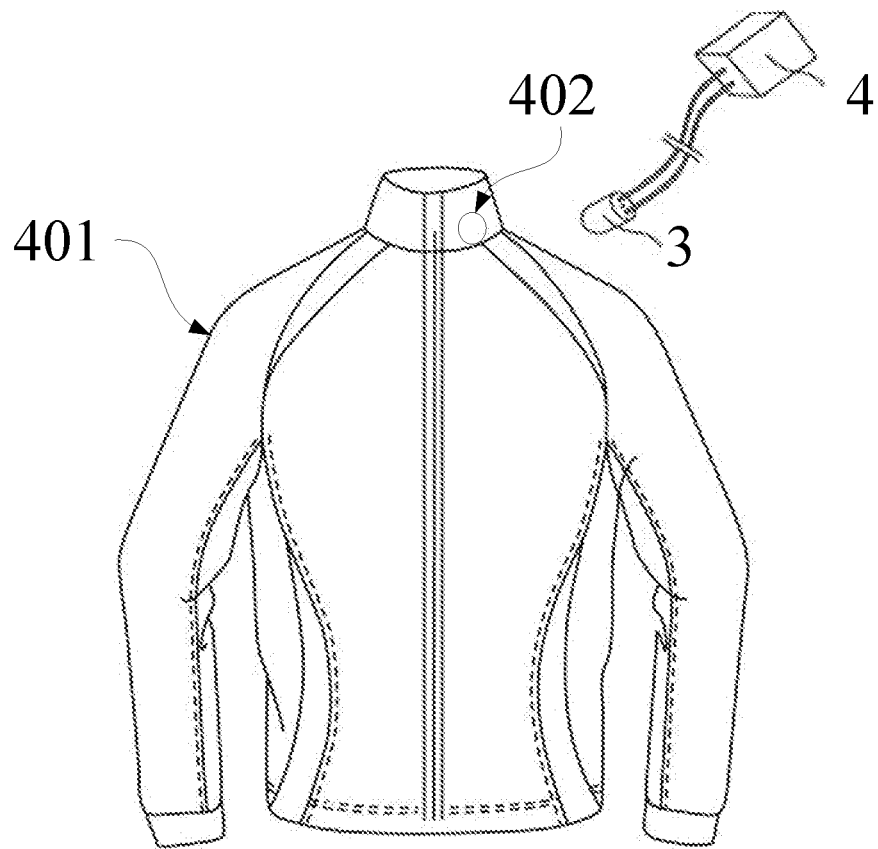
FIG. 4 is an illustrative diagram of an intelligent wearable device where the wearable article body is a jacket.

FIG. 4 show an example of an intelligent wearable device where the wearable article is a jacket. The jacket 401 may be formed by weaving a plurality of textile threads with a plurality of light-guiding filaments. The jacket 401 may be provided with a light-collecting region 402. In the present embodiment, the light-collecting region 402 may be provided on the collar, cuff, or other region of the jacket 401 as long as the light-collecting region 402 can allow light to transmit to the plurality of light-guiding filaments on the jacket 401. Light source 3 and control box 4 can be fixed on the jacket 401. For example, it can be sewn on the jacket 401. It can also be detachably coupled to the jacket 401, for example, in a specific location of the jacket 401 reserved for the control box 4 (such as pocket). It is necessary to note that for an embodiment containing acquisition module and/or audio module, the acquisition module and/or audio modules may be preferably located on the collar to facilitate the acquisition of the user's sound wave and to transmit sound wave to the user.

Figure 5:
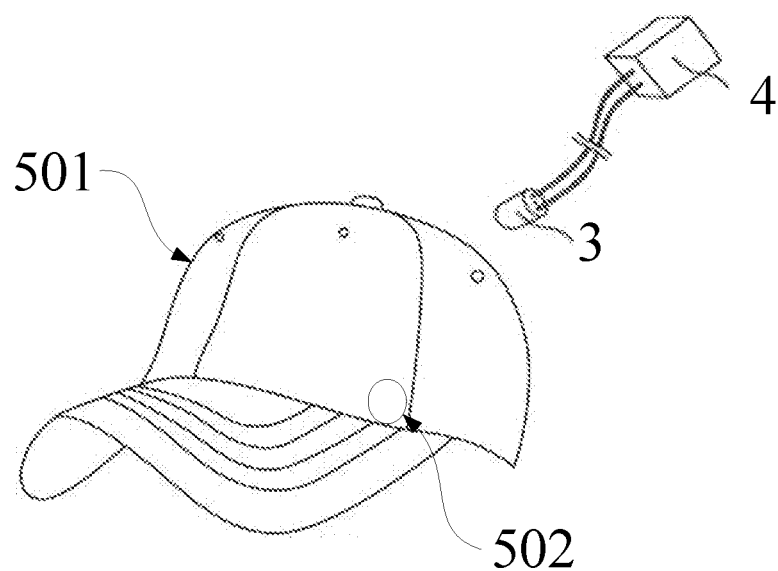
FIG. 5 is an illustrative diagram of an intelligent wearable device where the wearable article body is a cap.

FIG. 5 is an example of an intelligent wearable device where the wearable article body is a cap. The embodiment is not limited to cap, and may include hat and other head covering. The cap 501 may be formed by weaving a plurality of textile threads with a plurality of light-guiding filaments. The cap 501 may be provided with a light-collecting region 502. In the present embodiment, the light-collecting region 502 may be provided at the brim or the body of the cap. The light-collecting region 502 may also be provided at the front end, rear end or two sides of the cap, as long as the light-collecting region 502 can allow light to transmit to the plurality of light-guiding filaments on the cap 501. Light source 3 and control box 4 can be fixed on the cap 501. For example, it can be sewn on the cap 501. It can also be detachably coupled to the cap 501, for example, in a specific location of the cap 501 reserved for the control box 4 (such as a storage pocket). It is necessary to note that for an embodiment containing acquisition module and/or audio module, the acquisition module is preferably located at the front end of the cap to facilitate acquisition of the user's sound wave. The audio module is preferably located on two sides of the cap to transmit sound wave to the user.

Figure 6:
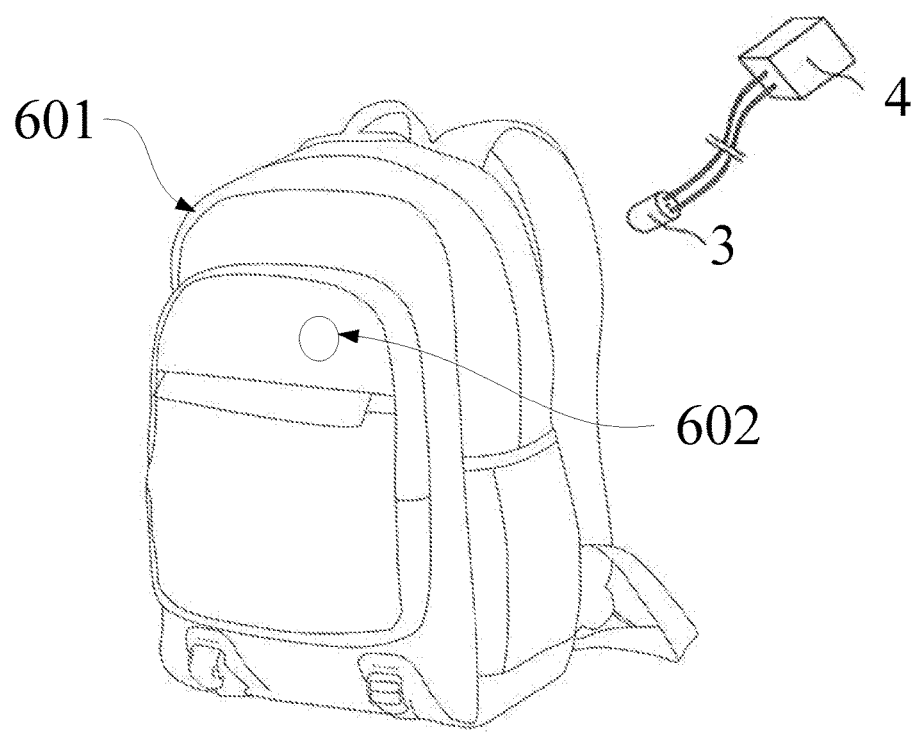
FIG. 6 is an illustrative diagram of an intelligent wearable device where the wearable article body is a backpack.

FIG. 6 is an example of an intelligent wearable device where the wearable article body is a backpack. The embodiment is not limited to a backpack, and may include single-shoulder bag, double-shoulder bag, etc. The backpack 601 may be formed by weaving a plurality of textile threads with a plurality of light-guiding filaments. The backpack 601 may be provided with a light-collecting region 602. In the present embodiment, the position of the light-collecting region 602 is not limited, as long as the light-collecting region 602 can allow light to transmit to the plurality of light-guiding filaments on the backpack 601. Light source 3 and control box 4 can be fixed on the backpack 601. It can also be detachably attached to the backpack 601.

The present embodiment also discloses an intelligent wearable device including a wearable article, wherein the wearable article may include a wearable article body, a light collector, and a light source. The wearable article body may be formed by weaving a plurality of textile threads with a plurality of light-guiding filaments. At least one of the plurality of light-guiding filaments can transmit some light. The wearable article body may be provided with a light-collecting region. The light collector may be provided at the light-collecting region. The light collector can be used for providing a light source placement region. Light-guiding entrances of the plurality of light-guiding filaments may be grouped together at the light collector to respectively conduct light received by the light collector. The light source may be detachably placed in the light source placement region for providing light to the light collector. It should be noted that the wearable article may also include elements that are disclosed in the above embodiments, such as controller, etc. The embodiment and specific example of these elements of the wearable article may also include the disclosure of the above embodiments.

Figure 7:
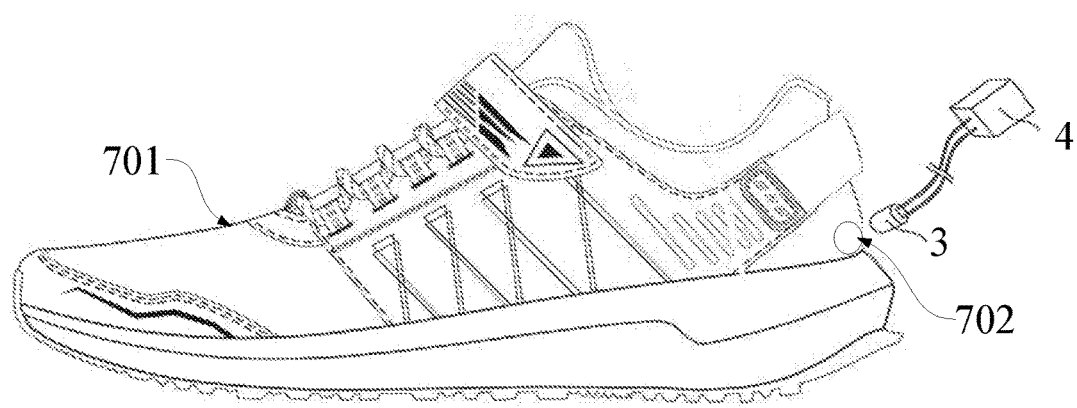
FIG. 7 is an illustrative diagram of an intelligent wearable device where the wearable article body is a shoe.

FIG. 7 is an example of an intelligent wearable device where the wearable article body is a shoe 701. Control box 4 may be provided in a sole of the shoe. A plurality of light-guiding filaments may extend respectively from two sides of an upper of the shoe to the sole of the shoe, group together and then connect to the light collector. Specifically, the shoe 701 may include an upper and a sole. In some embodiments, the upper and the sole can be formed by the weaving of a plurality of light-guiding filaments. In other embodiments, the upper can be formed by the weaving of a plurality of light-guiding filaments, and the sole can be made of existing sole material. In the present embodiment, the light-collecting region 702 may be located at a rear end of the upper. The plurality of light-guiding filaments can transmit light from the light-collecting region and along two sides of the upper. Control box 4 may be provided in the sole of the shoe. Specifically, it may be provided in the heel of the shoe. In one embodiment, two light-collecting regions may be provided, and located at the rear end of the upper. The two light-collecting regions may receive light from two light sources respectively, and light received from the light sources can be transmitted along two sides of the upper respectively.

In the wearable article and the intelligent wearable device provided by the embodiments of the present disclosure, the wearable article body may be formed by weaving a plurality of textile threads with a plurality of light-guiding filaments. Since the light-guiding entrances of the plurality of light-guiding filaments are grouped together at the light collector, the plurality of light-guiding filaments can transmit light after light is provided to the light collector from the light source.

Since at least one light-guiding filament can transmit some light, the wearable article body can actively have light glowing to the outside environment, and the luminous effect can be improved. Furthermore, since the light-guiding entrances are grouped together at the light collector, the layout area of the circuits on the wearable article body can be reduced, and therefore the chance of circuit structure failure caused by deformation of the wearable article body can also be reduced. This can prolong the working life of the luminous components, and reduce the security risk.

Specific embodiments have been described above with reference to the accompanying drawings. However, the present disclosure is not limited to the above specific embodiments. The above specific embodiments are merely illustrative and should not be considered as limiting. It should be noted that, upon reading the above disclosure, a person skilled in the art can make various other changes or modifications without departing from the scope of the appended claims.

What is claimed is:

1. A wearable article, comprising:
   a wearable article body, formed by weaving a plurality of textile threads with a plurality of light-guiding filaments, at least one of the plurality of light-guiding filaments being able to transmit some light, the wearable article body being provided with a light-collecting region;
   a light collector, provided at the light-collecting region, the light collector being provided with a light source placement region, light-guiding entrances of the plurality of light-guiding filaments being grouped together at the light collector to respectively transmit light received by the light collector; and
   a light source, detachably placed in the light source placement region for providing light to the light collector;
   wherein the light source is a three-color LED (light-emitting diode) lamp, the light source placement region is a through-hole structure that cooperates with the three-color LED lamp, the three-color LED lamp is capable of penetrating into one end of the through-hole structure covered with an opaque cover layer, and the light-guiding entrances of the plurality of light-guiding filaments are grouped together at another end of the through-hole structure.

2. The wearable article according to claim 1, further comprising a control box, the control box comprising a printed circuit board which provides a drive signal to the light source in order to control light emission state of the light source.

3. The wearable article according to claim 2, wherein the control box further comprises:
- a battery, which supplies power to the printed circuit board;
- a flexible filler, disposed between the printed circuit board and the battery; and
- a resin glue, filled up inside the control box.

4. The wearable article according to claim 2, further comprising an acquisition module, in signal communication with the printed circuit board, wherein the printed circuit board adjusts the drive signal provided to the light source according to a sound wave signal acquired by the acquisition module.

5. The wearable article according to claim 4, further comprising an audio module, in signal communication with the printed circuit board to propagate sound wave upon excitement by an audio signal provided by the printed circuit board.

6. The wearable article according to claim 5, further comprising:
- a memory, that stores a plurality of audio signals, the plurality of audio signals being respectively mapped one to one with a plurality of trigger signals;
- wherein the printed circuit board analyzes the sound wave signal acquired by the acquisition module so as to obtain a trigger signal that corresponds to the acquired sound wave signal, and the printed circuit board retrieves an audio signal that corresponds to the trigger signal from the memory according to the trigger signal, and transmits the audio signal to the audio module.

7. The wearable article according to claim 5, further comprising:
- a trigger, in responding to a preset trigger condition, activates the printed circuit board to transmit to the audio module an audio signal that corresponds to the trigger condition.

8. The wearable article according to claim 2, wherein the control box further comprises a wireless communication module, in signal communication with the printed circuit board, the wireless communication module being configured to carry out data interaction with an external terminal.

9. An intelligent wearable device, comprising the wearable article according to claim 1, wherein the wearable article body is a jacket, a cap, a backpack, or a glove.

10. An intelligent wearable device, comprising the wearable article according to claim 2, wherein the wearable article body is a shoe, the control box is provided in a sole of the shoe, the plurality of light-guiding filaments extend respectively from two sides of an upper of the shoe to the sole of the shoe, group together, and then connect to the light collector.

* * * * *